United States Patent
Kawasaki et al.

(10) Patent No.: US 6,458,894 B1
(45) Date of Patent: *Oct. 1, 2002

(54) RUBBER MODIFIER OF ETHYLENE/α-OLEFIN (/DIENE) COPOLYMER RUBBER(S)

(75) Inventors: Masaaki Kawasaki; Taku Koda; Takashi Hakuta, all of Ichihara; Tetsuo Tojo, Chiba, all of (JP)

(73) Assignee: Mitsui Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,893

(22) Filed: Sep. 11, 1997

(30) Foreign Application Priority Data

Sep. 30, 1996 (JP) .............................. 8-259470
Aug. 19, 1997 (JP) .............................. 9-222773

(51) Int. Cl.⁷ .......................... C08L 23/08; C08L 23/16
(52) U.S. Cl. .................. 525/237; 525/232; 525/240
(58) Field of Search ....................... 525/232, 237, 525/240

(56) References Cited

U.S. PATENT DOCUMENTS

| 3,794,611 A | | 2/1974 | Brice | |
|---|---|---|---|---|
| 4,438,238 A | | 3/1984 | Fukushimi et al. | 525/240 |
| 4,510,303 A | * | 4/1985 | Oda et al. | 525/332.8 |
| 4,843,128 A | | 6/1989 | Cesare | 525/193 |
| 5,324,771 A | * | 6/1994 | Suehiro et al. | 525/232 |
| 5,610,254 A | * | 3/1997 | Sagane et al. | 524/554 |

FOREIGN PATENT DOCUMENTS

| EP | 0446380 A1 | 9/1991 |
|---|---|---|
| EP | 0446382 A1 | 9/1991 |
| EP | 0532764 A1 | 3/1993 |
| GB | 1339061 | 11/1973 |
| JP | 55-30130 | * 3/1980 |
| JP | 55-036251 | 3/1980 |
| JP | 55-78042 | * 6/1980 |
| JP | 56-98275 | * 8/1981 |
| JP | 63-8408 | * 1/1988 |
| JP | 63-15809 | * 1/1988 |
| JP | 3-136825 | * 6/1991 |
| JP | 5-86236 | * 4/1993 |

* cited by examiner

Primary Examiner—Robert E. L. Sellers
(74) Attorney, Agent, or Firm—Birch, Stewart, Kolasch & Birch, LLP

(57) ABSTRACT

A rubber modifier comprises an ethylene/α-olefin copolymer rubber (A) composed of one or more copolymers selected from the group consisting of a copolymer of ethylene and an α-olefin having 3–20 carbon atoms and a copolymer of ethylene, an α-olefin having 3–20 carbon atoms and a non-conjugated polyene, the copolymer rubber (A) having the parameters:

an ethylene/α-olefin mole ratio in the range of 51/49 to 87/13, an intrinsic viscosity [η] determined in decahydronaphthalene at 135° C. in the range of 0.8 to 2.5 dl/g and an iodine value in the range of 0 to 40.

13 Claims, No Drawings

RUBBER MODIFIER OF ETHYLENE/α-OLEFIN (/DIENE) COPOLYMER RUBBER(S)

FIELD OF THE INVENTION

The present invention relates to a rubber modifier for improving workability in roll kneading, extrusion and so on by admixing to rubber and, more specifically, to a rubber modifier superior in the effect of modification of workability and in the handling.

DESCRIPTION OF THE RELATED TECHNIQUES

Ethylene/propylene copolymer rubber (EPR) and ethylene/propylene/diene copolymer rubber (EPDM) are superior in the heat resistance and weatherability, as compared with generally used rubbers based on diene, since they do not have unsaturation bond in the main chain, so that they find application in many products including automobile parts, industrial structural materials and parts and so on.

In accordance with the increased requirement for the performance of rubber products in recent years, the molecular weights of EPR and EPDM tend to become increased. However, EPRs and EPDMs having higher molecular weights are inferior in the workability in, for example, roll kneading and extrusion, whereby a problem results in the production efficiency.

A lower molecular weight ethylene/α-olefin copolymer rubber is known to have an ability to of improve the above-mentioned workability without deteriorating the material properties of the rubber.

However, such a lower molecular weight ethylene/α-olefin copolymer rubber exhibits too high of a viscosity to handle it as a flowable mass but is too soft to handle it as a solid mass, so that its handling performance is too low to be used widely.

Therefore, it has been expected to find a novel rubber modifier which is superior in the handling performance and which can afford to improve the workability of an ethylene/α-olefin copolymer rubber, such as EPR or EPDM, in roll kneading and in extrusion without deteriorating the material properties intrinsic for such a copolymer rubber by simply admixing thereto.

SUMMARY OF THE INVENTION

An object of the present invention is to obviate the problem incidental to the prior technique mentioned above and to provide a rubber modifier which is easy to handle and which can improve the workability of ethylene/α-olefin copolymer rubber, such as EPR and EPDM, without deteriorating the material properties of the copolymer rubber to be blended with the rubber modifier.

Thus, the present invention is directed to a rubber modifier which comprises an ethylene/α-olefin copolymer rubber (A) composed of one or more copolymers selected from the group consisting of a copolymer of ethylene and an α-olefin having 3–20 carbon atoms and a copolymer of ethylene, an α-olefin having 3–20 carbon atoms and a non-conjugated polyene, wherein the copolymer rubber (A) has the parameters of an ethylene/α-olefin mole ratio in the range of 51/49 to 87/13, an intrinsic viscosity [η] determined in decahydronaphthalene at 135° C. in the range of 0.8 to 2.5 dl/g and an iodine value in the range of 0 to 40.

A preferred rubber modifier according to the present invention comprises

60–90% by weight of an ethylene/α-olefin copolymer rubber (A1) having the parameters of an ethylene/α-olefin mole ratio in the range of 50/50 to 85/15, an intrinsic viscosity [η] determined in decahydronaphthalene at 135° C. in the range of 0.2 to 0.9 dl/g and an iodine value in the range of 0 to 40 and 10–40% by weight of an ethylene/α-olefin copolymer rubber (A2) having the parameters of an ethylene/α-olefin mole ratio in the range of 60/40 to 90/10, an intrinsic viscosity [η] determined in decahydronaphthalene at 135° C. in the range of 3 to 6 dl/g and an iodine value in the range of 0 to 40.

DETAILED DESCRIPTION OF THE INVENTION

<<The Ethylene/α-Olefin Copolymer Rubber (A)>>

The ethylene/α-olefin copolymer rubber (A) to be used according to the present invention as the rubber modifier is composed of one or more copolymers selected from the group consisting of (1) a copolymer of ethylene and an α-olefin having 3–20 carbon atoms, preferably 3–8 carbon atoms, and (2) a copolymer of ethylene, an α-olefin having 3–20 carbon atoms, preferably 3–8 carbon atoms and a non-conjugated polyene.

For the α-olefin having 3–20 carbon atoms, there may be enumerated concretely, for example, propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. These α-olefins can be used alone or in a combination of two or more of them. Among them, particular preference is given to α-olefins having 3–8 carbon atoms, such as, propylene, 1-butene and 1-octene.

As the non-conjugated polyene, there may be enumerated, for example, cyclic dienes, such as, 5-ethylidene-2-norbornene, 5-propylidene-5-norbornene, dicyclopentadiene, 5-vinyl-2-norbornene, 5-methylene-2-norbornene, 5-isopropylidene-2-norbornene and norbornadiene; chain-formed non-conjugated dienes, such as, 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene; and trienes, such as, 2,3-diisopropylidene-5-norbornene and 4-ethylidene-8-methyl-1,7-nonadiene. Among them, 1,4-hexadiene, dicyclopentadiene and 5-ethylidene-2-norbornene are preferred.

The ethylene/α-olefin copolymer rubber (A) has an ethylene/α-olefin mole ratio in the range from 51/49 to 87/13, preferably from 55/45 to 80/20, especially preferably from 55/45 to 75/25, an intrinsic viscosity [η] determined in decahydronaphthalene at 135° C. in the range from 0.8 to 2.5 dl/g, preferably from 1.0 to 2.0 dl/g, especially preferably from 1.2 to 1.8 dl/g, and an iodine value in the range from 0 to 40, preferably from 0 to 20, especially preferably from 0 to 10.

The ethylene/α-olefin copolymer rubber (A) to be used as the rubber modifier according to the present invention may be composed of one single copolymer rubber of ethylene/α-olefin or a composition of two or more copolymer rubbers of ethylene/α-olefin, so long as the three parameters of the ethylene/α-olefin mole ratio, the intrinsic viscosity [η] and the iodine value thereof are in the above-defined ranges, respectively.

For the ethylene/α-olefin copolymer rubber (A) consisting of a composition of two or more copolymer rubbers of ethylene/α-olefin, it is permissible not only that all the parameters of ethylene/α-olefin mole ratio, intrinsic viscosity [η] and iodine value of each individual copolymer rubber are in the above-defined ranges, respectively, but also that one or more of these parameters of individual copolymer rubber are outside the above-defined respective range, so long as the three parameters as regards the composition are in the above-defined respective range.

It is permissible to incorporate any voluntary combination of individual ethylene/α-olefin copolymer rubbers for such a composite copolymer rubber (A), so long as the above-mentioned three parameters as regards the composition are in the above-defines ranges, respectively. Concrete examples of such a composite copolymer rubber (A) include the followings:

1) A composition composed of two or more of ethylene/α-olefin copolymer rubbers in which all the three parameters of ethylene/α-olefin mole ratio, intrinsic viscosity [η] and iodine value of each individual copolymer rubber are in the above-defined ranges, respectively.
2) A composition composed of two or more of ethylene/α-olefin copolymer rubbers in which one or two of the above three parameters are in the above-defined respective range.
3) A composition composed of two or more of ethylene/α-olefin copolymer rubbers in which all the above three parameters are outside the above-defined respective range.
4) A composition composed of one or more of ethylene/α-olefin copolymer rubbers in which all the above three parameters are in the above-defined respective range and of one or more of ethylene/α-olefin copolymer rubbers in which one or two of the above three parameters are in the above-defined respective range and/or all the above three parameters are outside the above-defined respective range.
5) A composition composed of one or more of ethylene/α-olefin copolymer rubbers in which one or two of the above three parameters are in the above-defined respective range and of one or more of ethylene/α-olefin copolymer rubbers in which all the above three parameters are outside the above-defined respective range.

For the ethylene/α-olefin copolymer rubber (A) to be used as the rubber modifier of the present invention, a composition composed of an ethylene/α-olefin copolymer rubber having a relatively lower molecular weight and of an ethylene/α-olefin copolymer rubber having a relatively higher molecular weight is preferred and a special preference is given to a composition which comprises 60–90% by weight of an ethylene/α-olefin copolymer rubber (A1) having the parameters of an ethylene/α-olefin mole ratio in the range of 50/50 to 85/15, an intrinsic viscosity [η] determined in decahydronaphthalene at 135° C. in the range of 0.2 to 0.9 dl/g and an iodine value in the range of 0 to 40 and 10–40% by weight of an ethylene/α-olefin copolymer rubber (A2) having the parameters of an ethylene/α-olefin mole ratio in the range of 60/40 to 90/10, an intrinsic viscosity [η] determined in decahydronaphthalene at 135° C. in the range of 3 to 6 dl/g and an iodine value in the range of 0 to 40.

<<The Ethylene/α-Olefin Copolymer Rubber (A1)>>

The ethylene/α-olefin copolymer rubber (A1) is composed of one or more copolymers selected from the group consisting of a copolymer of ethylene and an α-olefin having 3–20 carbon atoms, preferably 3–8 carbon atoms, and a copolymer of ethylene, an α-olefin having 3–20 carbon atoms, preferably 3–8 carbon atoms and a non-conjugated polyene and has a molecular weight lower than that of the ethylene/α-olefin copolymer rubber (A2) which is referred to afterwards.

For the α-olefin having 3–20 carbon atoms and for the non-conjugated polyene, those exemplified previously for the ethylene/α-olefin copolymer rubber (A) may be used.

The ethylene/α-olefin copolymer rubber (A1) has an ethylene/α-olefin mole ratio in the range from 50/50 to 85/15, preferably from 55/45 to 80/20, especially preferably from 60/40 to 75/25, an intrinsic viscosity [η] determined in decahydronaphthalene at 135° C. in the range from 0.2 to 0.9 dl/g, preferably from 0.3 to 0.7 dl/g, especially preferably from 0.35 to 0.65 dl/g, and an iodine value in the range from 0 to 40, preferably from 0 to 20, especially preferably from 0 to 10.

<<The Ethylene/α-Olefin Copolymer Rubber (A2)>>

The ethylene/α-olefin copolymer rubber (A2) is composed of one or more copolymers selected from the group consisting of a copolymer of ethylene and an α-olefin having 3–20 carbon atoms, preferably 3–8 carbon atoms, and a copolymer of ethylene, an α-olefin having 3–20 carbon atoms, preferably 3–8 carbon atoms and a non-conjugated polyene and has a molecular weight higher than that of the ethylene/α-olefin copolymer rubber (A1).

For the α-olefin having 3–20 carbon atoms and for the non-conjugated polyene, those monomers exemplified as for the ethylene/α-olefin copolymer rubber (A) may be employed. The α-olefins and the non-conjugated polyenes employed may either be identical with or different from those used for the ethylene/α-olefin copolymer rubber (A1).

The ethylene/α-olefin copolymer rubber (A2) has an ethylene/α-olefin mole ratio in the range from 50/50 to 90/10, preferably from 60/40 to 85/15, especially preferably from 65/35 to 80/20, an intrinsic viscosity [η] determined in decahydronaphthalene at 135° C. in the range from 3 to 6 dl/g, preferably from 3.3 to 5 dl/g, especially preferably from 3.5 to 4.5 dl/g, and an iodine value in the range from 0 to 40, preferably. from 5 to 35, especially preferably from 10 to 30. The iodine value of the ethylene/α-olefin copolymer rubber (A2) may either be identical with or different from that of the ethylene/α-olefin copolymer rubber (A1).

<<Blending Proportion>>

For the ethylene/α-olefin copolymer rubber (A) which is a composition comprising the ethylene/α-olefin copolymer rubber (A1) and the ethylene/α-olefin copolymer rubber (A2), the content of the ethylene/α-olefin copolymer rubber (A1) may be 90–60%, preferably 85–70%, based on the total weight of the component rubbers (A1) and (A2), and the content of the ethylene/α-olefin copolymer (A2) may be 10–40%, preferably 15–30%, based on the total weight of the component rubbers (A1) and (A2).

If the content of the component rubber (A2) is less than 10% by weight of the total of the component rubbers, the viscosity or tenacity of the composition becomes low and handling thereof becomes difficult, whereas, if it exceeds 40% by weight, the effect of the improvement becomes insignificant.

For the ethylene/α-olefin copolymer rubber (A) which is a composition comprising the ethylene/α-olefin copolymer rubber (A1) and the ethylene/α-olefin copolymer rubber (A2), those component rubbers (A1) and (A2) in which the three parameters identified previously are in the respective range defined previously may be employed, wherein those in which all the three parameters are in the respective preferable range are at the most preferred. However, those in which certain parameters are in the respective preferable range and others are in the respective defined but not preferable range may also preferably be employed.

<<Rubber Modifier>>

The rubber modifier according to the present invention comprises the ethylene/α-olefin copolymer rubber (A) and is blended to a practical general rubber (B) to improve the workability of such a rubber (B).

The rubber modifier (A) according to the present invention is superior in the effect of improving the workability in roll kneading, extrusion and so on of the rubber (B) to be blended with the rubber modifier (A) without deteriorating the material properties of the rubber (B). Moreover, it is superior in the handling performance, so that it can be processed by a Bale slicer used commonly in rubber processing and can be weighed on a weighing apparatus.

For the rubber (B) to which the rubber modifier (A) according to the present invention is blended, there is no special restriction so long as it deals with any rubber to be subjected to an improvement in the workability in roll kneading or extrusion molding, though preference is given for ethylene/propylene copolymer rubber (EPR) and ethylene/propylene/diene copolymer rubber (EPDM).

The blending proportion of the rubber modifier (A) according to the present invention may desirably be chosen in the range of 20–200 parts by weight, preferably 40–150 parts by weight, per 100 parts by weight of the rubber (B) to be modified.

As described above, the rubber modifier according to the present invention can modify the workability of the rubber (B) to which the rubber modifier is blended, without deteriorating the material properties of the rubber blended with the rubber modifier, since it consists of a specific ethylene/α-olefin copolymer rubber (A). Moreover, the rubber modifier according to the present invention is easy in handling and is superior in the effect of improvement of the working performance of the rubber modifier.

THE BEST MODE FOR EMBODYING THE INVENTION

In the following, the present invention will be described by way of Examples, wherein these Examples should not be understood as imparting to the invention any restriction.

The material properties and the working performance of the composite ethylene/α-olefin copolymer rubber employed as the rubber modifier are recited in Table 1.

TABLE 1

| Rub. Modifier | (1) | (2) | (3) | (4) | (5) |
|---|---|---|---|---|---|
| Eth./α-Olef. Mole Ratio[1] | 70/30 | 69/31 | 73/27 | 69/31 | 68/32 |
| I.V. [η][2] | 1.4 | 1.3 | 1.3 | 1.2 | 1.5 |
| Iodine Value | 3 | 2 | 10 | 0 | 8 |
| Work. Perf.[3] | Better | Better | Better | Better | Better |

Notes:
[1]Ethylene/α-olefin mole ratio.
[2]Intrinsic viscosity in dl/g.
[3]Working performance:

TABLE 1-continued

| Rub. Modifier | (1) | (2) | (3) | (4) | (5) |
|---|---|---|---|---|---|

Each of the rubber modifiers was processed into a test sheet of 10 cm × 2 cm × 2 mm, placed on a stainless steel plate and stood still at room temperature for 1 hour, whereupon the peelability of the sheet from the plate was estimated by the criterion:
Better: The sheet can completely be peeled off from the plate when the sheet is drawn upwards from its one edge.
Worse: A rest of the sheet is found on the plate after the peeling test.

The composition of the rubber modifiers (1) to (5) as given in Table 1 are recited in Table 2 below.

TABLE 2

| | Modifier | | | | |
|---|---|---|---|---|---|
| Composition | (1) | (2) | (3) | (4) | (5) |
| Copolymer (A1) | | | | | |
| α-Olefin | Propylene | Propylene | 1-Butene | Propylene | Propylene |
| Polyene | — | — | ENB[1] | — | VNB[2] |
| Eth./α-Olef. Mole Ratio[3] | 70/30 | 68/32 | 74/26 | 68/32 | 68/32 |
| I.V. [η][4] | 0.5 | 0.55 | 0.5 | 0.45 | 0.56 |
| Iodine Value | 0 | 0 | 5 | 0 | 6 |
| Copolymer (A2) | | | | | |
| α-Olefin | Propylene | Propylene | Propylene | Propylene | Propylene |
| Polyene | ENB[1] | ENB[1] | ENB[1] | — | ENB[1] |
| Eth./α-Olef. Mole Ratio[3] | 70/30 | 75/25 | 70/30 | 72/28 | 68/32 |
| I.V. [η][4] | 4.0 | 4.5 | 3.3 | 3.5 | 3.7 |
| Iodine Value | 12 | 12 | 22 | 0 | 12 |
| (A1)/(A2) Wt. Ratio | 75/25 | 80/20 | 70/30 | 75/25 | 70/30 |
| Work. Perf.[5] | Better | Better | Better | Better | Better |

Notes:
[1]ENB = 5-ethylidene-2-norbornene.
[2]VNB = 5-vinyl-2-norbornene.
[3]Ethylene/α-olefin mole ratio.
[4]Intrinsic viscosity [η] in dl/g.
[5]See the note 2) of Table 1.

In the Examples and Comparative Examples using the rubber modifiers given in Table 1, the testing of the unvulcanized rubber compositions and the vulcanized rubbers was performed as follows:
(1) Workability Test in Roll Kneading Kneading of the unvulcanized rubber composition was effected at a roll temperature for both the fore and aft rollers of 55° C. for 5 minutes, whereupon the performances in the gripping of the rubber in between the rollers and in the wrapping around the roller were observed, in order to evaluate the workability in roll kneading by the following 5 grades:

Grade 5: Rubber band fits the roller completely closely and the bank rotates smoothly.

Grade 4: Rubber band detaches sometimes from the roller in the region between the apex and the bank of the roller.

Grade 3: Rubber band detaches from the roller in the region between the apex and the bank of the roller.

Grade 2: Rubber band does not adhere onto the roller surface and roll kneading cannot be realized so long as the rubber band is not supported by hand.

Grade 1: Rubber band does not adhere at all onto the roller surface and hangs down so that roll kneading cannot be realized so long as the rubber band is not supported by hand.

(2) Tesnile Test

A No. 3 dumbbell test piece defined according to JIS K 6301 was punched out from a vulcanized rubber sheet, with which a tensile test was performed by the method prescribed in the norm of JIS K 6301 (3) at a temperature of 25° C. at a towing velocity of 500 mm/min, in order to determine the tensile breaking stress ($T_B$) and the tensile breaking elongation ($E_B$).

(3) Hardness Test

In the hardness test, the spring hardness $H_S$ (the JIS A-Hardness) of the vulcanized rubber was dertermined in accordance with the method prescribed in JIS K 6301.

(4) Compressive Permanent Strain Test

In the compressive permanent strain test, a low temperature compressive permanent strain (CS) was determined by the method prescribed in JIS K 6301 at a temperature of 120° C. after 72 hours.

EXAMPLE 1

83.3 parts by weight of an ethylene/propylene/ENB copolymer (denoted hereinafter as EPDM-1) having an ethylene content of 70 mole %, an intrinsic viscosity [η] of 4.0 dl/g and an iodine value of 22, 66.7 parts by weight of the rubber modifier (1) as given in Table 1, 5 parts by weight of No.1 zinc white product, 1 part by weight of stearic acid, 60 parts by weight of MAF carbon black product and 10 parts by weight of a paraffin oil (DIANA PROCESS PW-380 (trademark) of Idemitsu Kosan Co., Ltd.) were blended on a Bumbury mixer of a capacity of 4.3 liters.

To the so-obtained blend, 1.5 parts by weight of zinc dimethyldithiocarbamate, 1.2 parts by weight of tetramethylthiuram disulfide, 0.5 part by weight of 2-mercaptobenzothiazole and 0.6 part by weight of sulfur were added and the mixture was kneaded on a roller kneader. Then, the kneaded mass was subdividedly extruded each into a sheet, which was subjected to a press-vulcanization at 170° C. for 17 minutes, whereby a vulcanized rubber sheet test piece having a thickness of 2 mm was obtained. This test piece was tested for the material properties in accordance with the testing procedures given above. The test results are recited in Table 3.

Comparative Example 1

The same procedures of Example 1 were followed except that the amounts of EPDM-1 and the paraffin oil were changed to 100 parts by weight and 60 parts by weight, respectively, and the rubber modifier (1) was not incorporated. The test results are recited in Table 3.

Comparative Example 2

The same procedures of Comparative Example 1 were followed except that the amount of paraffin oil was changed to 10 parts by weight and 50 parts by weight of an ethylene/propylene copolymer (referred to hereinafter as EPR-1) having an ethylene content of 68 mole % and an intrinsic viscosity [η] of 0.5 dl/g were admixed. The test results are recited in Table 3.

By the way, it was recognized upon weighing the EPR-1 that this EPR-1 was difficult to be weighed by ordinary weighing procedures, since it sticked onto the blade of the Bale slicer upon cutting down into pieces and onto the weighing dish upon weighing on a balance. Thus, the handling performance of this EPR-1 was low, since it had to be melted at a temperature above 100° C. in order to weigh it.

EXAMPLES 2 AND 3

The same procedures of Example 1 were followed except that the rubber modifier (1) was changed to the rubber modifier (2) or (3) of Table 1 and the amount of each component was settled as given in Table 3. The test results are recited in Table 3.

TABLE 3

|  | Example | | | Comp. Example | |
| --- | --- | --- | --- | --- | --- |
|  | 1 | 2 | 3 | 1 | 2 |
| Composition[1] | | | | | |
| EPDM-1 | 83.3 | 87.5 | 78.5 | 100 | 100 |
| Rub. Modifier | 66.7 | 62.5 | 71.5 | — | — |
| Paraffin oil | 10 | 10 | 10 | 60 | 10 |
| EPR-1 | — | — | — | — | 50 |
| Handling[2] | Better | Better | Better | Better | Worse |
| Workability[3] | 5 | 5 | 5 | 1 | 5 |
| Properties[4] | | | | | |
| $T_B$ (MPa) | 16.7 | 17.1 | 16.2 | 14.2 | 16.0 |
| $E_B$ (%) | 490 | 480 | 520 | 560 | 480 |
| $H_S$[5] | 53 | 54 | 53 | 53 | 53 |
| $CS$[6] (%) | 42 | 41 | 44 | 47 | 44 |

Notes
[1] Composition in part by weight; for the components other than those given here, see the description of respective Example and Comparative Example.
[2] Handling performance; "Better" means that the rubber modifier or EPR-1 does not stick onto Bale slicer blade or weighing dish and "Worse" means that ordinary weighing procedure using Bale slicer is impossible due to sticking of the rubber modifier onto the slicer blade etc.
[3] Workability in roll kneading.
[4] Physical properties of the vulcanized rubber.
[5] Spring hardness: JIS A-hardness.
[6] Compressive permanent stress.

EXAMPLE 4

83 parts by weight of an ethylene/propylene/5-vinyl-2-norbornene copolymer (denoted hereinafter as EPDM-2) having an ethylene content of 69 mole %, an intrinsic viscosity [η] of 3.6 dl/g and an iodine value of 3, 67 parts by weight of the rubber modifier (4) as given in Table 1, 5 parts by weight of No. 1 zinc white product, 1 part by weight of stearic acid, 100 parts by weight of MISTRON VAPOR (trademark; a product of NIHON MISTRON Co., Ltd.) and 20 parts by weight of a paraffin oil [DIANA PROCESS PW-380 (trademark) of Idemitsu Kosan Co., Ltd.] were kneaded on a Bumbury mixer of a capacity of 4.3 liters.

To the so-obtained blend, 2.7 parts by weight of dicumylperoxide and 3.5 parts by weight of p,p'-dibenzoylquinone dioxime were added and the mixture was kneaded on a roller kneader. Then, the kneaded mass was subdividedly extruded each into a sheet, which was subjected to a press-vulcanization at 170° C. for 10 minutes, whereby a vulcanized rubber sheet test piece having a thickness of 2 mm was obtained. This test piece was tested for the material properties in accordance with the testing procedures given above.

The resulting rubber blend was further examined for its extrusion performance on a 50 mm extruding machine in accordance with the norm of ASTM D 2230-77 using Garvey die at a die temperature of 90° C., a barrel temperature of 70° C. and a screw temperature of 80° C. at an extrusion velocity of 30 m/min. The evaluation of the extrusion performance is made by a visual estimation of sharpness of a 30° edge and smoothness of surface of the test piece in 5 ranks with the highest evaluation being represented by rank "5" and the lowest evaluation by rank "1". The results are recited in Table 4.

Comparative Example 3

The same procedures of Example 1 were followed except that the amount of the paraffin oil was changed to 60 parts by weight and the rubber modifier (4) was not incorporated. The test results are recited in Table 4.

EXAMPLE 5

The same procedures of Example 4 were followed except that the rubber modifier (4) was replaced by the rubber modifier (5). The test results are recited in Table 4.

TABLE 4

|  | Example 4 | Comp. Ex. 3 | Example 5 |
|---|---|---|---|
| Composition[1)] |  |  |  |
| EPDM-2 | 60 | 60 | 60 |
| Rub. Modifier | 40 | — | 40 |
| Paraffin oil | 20 | 60 | 20 |
| Workability[2)] | 5 | 4 | 5 |
| Properties[3)] |  |  |  |
| $T_B$ (MPa) | 7.4 | 6.1 | 7.1 |
| $E_B$ (%) | 520 | 480 | 460 |
| $H_S$[4)] | 61 | 59 | 64 |
| Extrusion[5)] |  |  |  |
| Smoothness | 5 | 3 | 5 |
| Sharpness | 5 | 3 | 5 |

Notes
[1)]Composition in part by weight; for the components other than those given here, see the description of Example 4.
[2)]Workability in roll kneading.
[3)]Physical properties of the vulcanized rubber.
[4)]Spring hardness: JIS A-hardness.
[5)]Extrusion performance in the smoothness of the surface and sharpness of 30° edge.

As seen from Tables 3 and 4, the rubber blend to which the rubber modifier according to the present invention is admixed exhibits a superior compressive permanent strain and excellent physical properties of the vulcanized rubber, together with a high workability in roll kneading and extrusion. The rubber modifier according to the present invention is superior in the working performance (i.e. handling performance), as seen in Tables 1 to 4.

What is claimed is:

1. A rubber modifier to be blended with a rubber for improving workability, comprising an ethylene/α-olefin copolymer rubber (A) comprising:
   (a) 60–90% by weight of an ethylene/α-olefin copolymer rubber (A1) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene,
   wherein said ethylene/α-olefin copolymer rubber (A1) has the parameters of
      (i) an ethylene/α-olefin mole ratio in the range of 50/50 to 85/15, and
      (ii) an intrinsic viscosity (η) determined in decahydronaphthalene at 135° C. in the range of 0.2 to 0.9 dl/g; and
   (b) 10–40% by weight of an ethylene/α-olefin copolymer rubber (A2) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene,
   wherein said ethylene/α-olefin copolymer rubber (A2) has the parameters of
      (i) an ethylene/α-olefin mole ratio in the range of 60/40 to 90/10, and
      (ii) an intrinsic viscosity (η) determined in decahydronaphthalene at 135° C. in the range of 3 to 6 dl/g;
the copolymer rubber (A) having the parameters of
   (i) an ethylene/α-olefin mole ratio in the range of 51/49 to 87/13,
   (ii) an intrinsic viscosity (η) determined in decahydronaphthalene at 135° C. in the range of 0.8 to 2.5 dl/g and
   (iii) an iodine value in the range of 0 to 3.

2. The rubber modifier of claim 1, wherein the copolymer rubber (A) has an ethylene/α-olefin mole ratio in the range of 55/45 to 80/20.

3. The rubber modifier of claim 1, wherein the copolymer rubber (A) has an intrinsic viscosity (η) in the range of 1.0 to 2.0 dl/g.

4. The rubber modifier of claim 1, wherein the ethylene/α-olefin copolymer rubber (A1) has an iodine value of 0.

5. The rubber modifier of claim 1, wherein said non-conjugated polyene is 5-ethylidene-2-norbornene or 5-vinyl-2-norbornene.

6. The rubber modifier of claim 1, which comprises:
an ethylene/α-olefin copolymer rubber (A) comprising:
   (a) 60–90% by weight of an ethylene/α-olefin copolymer rubber (A1) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene,
   wherein said ethylene/α-olefin copolymer rubber (A1) has the parameters of
      (i) an ethylene/α-olefin mole ratio in the range of 50/50 to 85/15, and
      (ii) an intrinsic viscosity (η) determined in decahydronaphthalene at 135° C. in the range of 0.35 to 0.65 dl/g; and
   (b) 10–40% by weight of an ethylene/α-olefin copolymer rubber (A2) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene,
   and wherein said ethylene/α-olefin copolymer rubber (A2) has the parameters of
      (i) an ethylene/α-olefin mole ratio in the range of 60/40 to 90/10, and
      (ii) an intrinsic viscosity (η) determined in decahydronaphthalene at 135° C. in the range of 3.3 to 5 dl/g;
the copolymer rubber (A) having the parameters of
   (i) an ethylene/α-olefin mole ratio in the range of 51/49 to 87/13,
   (ii) an intrinsic viscosity (η) determined in decahydronaphthalene at 135° C. in the range of 0.8 to 2.5 dl/g and
   (iii) an iodine value in the range of 0 to 3.

7. The rubber modifier of claim 1, which comprises:
an ethylene/α-olefin copolymer rubber (A) comprising:
   (a) 60–90% by weight of an ethylene/α-olefin copolymer rubber (A1) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene, wherein said ethylene/α-olefin copolymer rubber (A1) has the parameters of
- (i) an ethylene/α-olefin mole ratio in the range of 50/50 to 85/15, and
- (ii) an intrinsic viscosity (η) determined in decahydronaphthalene at 135° C. in the range of 0.35 to 0.9 dl/g; and (b) 10–40% by weight of an ethylene/α-olefin copolymer rubber (A2) comprising one or more copolymers selected from the group consisting of (1) a copolymer of ethylene and an α-olefin having 3–20 carbon atoms (2) a copolymer of ethylene, an α-olefin having 3–20 carbon atoms and a non-conjugated polyene, wherein said ethylene/α-olefin copolymer rubber (A2) has the parameters of
- (i) an ethylene/α-olefin mole ratio in the range of 60/40 to 90/10, and
- (ii) an intrinsic viscosity (η) determined in decahydronaphthalene at 135° C. in the range of 3.3 to 6 dl/g;

the copolymer rubber (A) having the parameters of
- (i) an ethylene/α-olefin mole ratio in the range of 51/49 to 87/13,
- (ii) an intrinsic viscosity (η) determined in decahydronaphthalene at 135° C. in the range of 0.8 to 2.5 dl/g, and
- (iii) an iodine value in the range of 0 to 3.

8. A rubber modifier to be blended with a rubber for improving workability, comprising an ethylene/α-olefin copolymer rubber (A) comprising:

(a) 70–85% by weight of an ethylene/α-olefin copolymer rubber (A1) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene, wherein said ethylene/α-olefin copolymer rubber (A1) has the parameters of
- (i) an ethylene/α-olefin mole ratio in the range of 50/50 to 85/15, and
- (ii) an intrinsic viscosity (η) determined in decahydronaphthalene at 135° C. in the range of 0.2 to 0.9 dl/g; and (b) 15–30% by weight of an ethylene/α-olefin copolymer rubber (A2) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene, wherein said ethylene/α-olefin copolymer rubber (A2) has the parameters of
- (i) an ethylene/α-olefin mole ratio in the range of 60/40 to 90/10, and
- (ii) an intrinsic viscosity (η) determined in decahydronaphthalene at 135° C. in the range of 3 to 6 dl/g;

the copolymer rubber (A) having the parameters of
- (i) an ethylene/α-olefin mole ratio in the range of 51/49 to 87/13,
- (ii) an intrinsic viscosity (η) determined in decahydronaphthalene at 135° C. in the range of 0.8 to 2.5 dl/g, and
- (iii) an iodine value in the range of 0 to 3.

9. The rubber modifier of claim 8, wherein the copolymer rubber (A) has an ethylene/α-olefin mole ratio in the range of 55/45 to 80/20.

10. The rubber modifier of claim 8, wherein the copolymer rubber (A) has an intrinsic viscosity (η) in the range of 1.0 to 2.0 dl/g.

11. The rubber modifier of claim 8, wherein the ethylene/α-olefin copolymer rubber (A1) has an iodine value of 0.

12. The rubber modifier of claim 8, wherein said non-conjugated polyene is 5-ethylidene-2-norbornene or 5-vinyl-2-norbornene.

13. The rubber modifier of claim 8, which comprises an ethylene/α-olefin copolymer rubber (A) comprising:

(a) 70–85% by weight of an ethylene/α-olefin copolymer rubber (A1) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene, wherein said ethylene/α-olefin copolymer rubber (A1) has the parameters of
- (i) an ethylene/α-olefin mole ratio in the range of 50/50 to 85/15, and
- (ii) an intrinsic viscosity (η) determined in decahydronaphthalene at 135° C. in the range of 0.35 to 0.65 dl/g; and (b) 15–30% by weight of an ethylene/a-olefin copolymer rubber (A2) comprising one or more copolymers selected from the group consisting of (1) a copolymer of ethylene and an α-olefin having 3–20 carbon atoms and (2) a copolymer of ethylene, an α-olefin having 3–20 carbon atoms and a non-conjugated polyene, and wherein said ethylene/α-olefin copolymer rubber (A2) has the parameters of
- (i) an ethylene/α-olefin mole ratio in the range of 60/40 to 90/10, and
- (ii) an intrinsic viscosity (η) determined in decahydronaphthalene at 135° C. in the range of 3.3 to 5 dl/g;

the copolymer rubber (A) having the parameters of
- (i) an ethylene/α-olefin mole ratio in the range of 51/49 to 87/13,
- (ii) an intrinsic viscosity (η) determined in decahydronaphthalene at 135° C. in the range of 0.8 to 2.5 dl/g and
- (iii) an iodine value in the range of 0 to 3.

* * * * *